US008191119B2

(12) United States Patent
Wing et al.

(10) Patent No.: US 8,191,119 B2
(45) Date of Patent: *May 29, 2012

(54) METHOD FOR PROTECTING AGAINST DENIAL OF SERVICE ATTACKS

(75) Inventors: Daniel G. Wing, San Jose, CA (US);
Cullen Jennings, San Jose, CA (US);
Jonathan D. Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 1806 days.

This patent is subject to a terminal disclaimer.

(21) Appl. No.: 11/369,307

(22) Filed: Mar. 6, 2006

(65) Prior Publication Data

US 2007/0124687 A1 May 31, 2007

Related U.S. Application Data

(63) Continuation-in-part of application No. 11/265,596, filed on Nov. 1, 2005, now Pat. No. 7,472,411.

(51) Int. Cl.
*G06F 7/04* (2006.01)
(52) U.S. Cl. ........... 726/5; 726/4; 713/151; 713/155; 713/162
(58) Field of Classification Search ............... 726/4, 5; 713/151, 155, 162
See application file for complete search history.

(56) References Cited

U.S. PATENT DOCUMENTS

| 6,865,681 | B2 | 3/2005 | Nuutinen |
| 7,290,281 | B1 | 10/2007 | McGrew |
| 7,472,411 | B2 * | 12/2008 | Wing et al. ............... 726/5 |
| 2003/0061506 | A1 | 3/2003 | Cooper et al. |
| 2004/0098619 | A1 | 5/2004 | Shay |
| 2005/0132060 | A1 * | 6/2005 | Mo et al. ............... 709/227 |

OTHER PUBLICATIONS

J. Rosenberg et al., "STUN—Simple Transversal of User Datagram Protocol (UDP) Through Network Address Translators (NATs)," Network Writing Group, Request for Comments (RFC) 3489, Mar. 2003, 44 pages.
C. Jennings, "NAT Classification Test Results," draft-jennings-behave-test-results-00, IETF Internet Draft, Feb. 13, 2005, 11 pages.
U.S. Appl. No. 10/185,159, filed Jun. 27, 2002, McGrew.
J. Rosenberg, http://www.ietf.org/internet-drafts/draft-ietf-mmusic-ice-06.txt, Oct. 19, 2005, 49 pages.
J. Rosenberg, http://www.ietf.org/internet-drafts/draft-ietf-mmusic-ice-05.txt, Jul. 17, 2005, 45 pages.
J. Rosenberg, http://www.jdrosen.net/papers/draft-rosenberg-mmusic-rtp-denialofservice-00.txt , Jun. 23, 2003, 13 pages.
V. Hilt, et al., *A Framework for Session Initiation Protocol (SIP) Session Policies*, Oct. 16, 2005, pp. 1-18.
M. Baugher, et al., *The Secure Real-Time Transport Protocol (SRTP)*, Mar. 2004, pp. 1-39.
J. Rosenberg, *Interactive Connectivity Establishment (ICE): A Methodology for Network Address Translator (NAT) Traversal for Offer/Answer Protocols*, Oct. 19, 2005, pp. 1-77.
V. Hilt, et al., *A Delivery Mechanism for Session-Specific Session Initiation Protocol (SIP) Session Policies*, Jul. 12, 2005, pp. 1-14.
International Searching Authority, International Search Report and Written Opinion, International Application No. PCT/US2006/026651, Nov. 7, 2006, pp. 3-10, International Searching Authority, European Patent Office.
Aoun, et al., NATFirewall NSLP Migration and Intra-Realm Communication Considerations, draft-aoun-nsis-nslp-natfw-migration-00, Internet Draft, Oct. 20, 2003, pp. 1-31, NSIS Working Group.
Stolowitz Ford Cowger LLP, Listing of Related Cases, Oct. 5, 2011.

* cited by examiner

*Primary Examiner* — Eleni Shiferaw
*Assistant Examiner* — Paul Callahan
(74) *Attorney, Agent, or Firm* — Stolowitz Ford Cowger LLP

(57) ABSTRACT

A security policy enables security devices to forward ICE messages. The security policy may use protection tokens to prevent Denial of Service (DoS) attacks. This allows endpoints to use Interactive Connectivity Establishment (ICE) to enable multimedia communications across Network Address Translators (NATs) and other security devices.

21 Claims, 11 Drawing Sheets

METHOD FOR PROTECTING AGAINST DENIAL OF SERVICE ATTACKS

CROSS REFERENCE TO RELATED APPLICATIONS

This application is a continuation-in-part of U.S. patent application Ser. No. 11/265,596, filed on Nov. 1, 2005, now U.S. Pat. No. 7,472,411, which is herein incorporated by reference in its entirety.

BACKGROUND OF THE INVENTION

This invention relates generally to Interactive Connectivity Establishment (ICE) and more particularly to using ICE across restrictive security boundaries such as restrictive Network Address Translator (NAT) boundaries or firewalls.

Endpoints such as Internet Protocol (IP) phones can make multimedia communications such as Voice over IP (VoIP) calls using multimedia session signaling protocols such as Session Initial Protocol (SIP). Devices such as NATs located between two endpoints can prevent the flow of multimedia session signaling protocol messages between the two endpoints. ICE was developed to allow multimedia communications to operate through NATs.

Even though ICE was developed to allow multimedia communications to operate through NATs, ICE is generally used before any multimedia communications whether or not NATs are located between two communicating endpoints. ICE is used because an endpoint is generally unaware of how many, if any, NATs are located between itself and another endpoint.

Briefly, ICE is performed as follows. Initially, two endpoints go through several steps to each establish a Simple Traversal of User Datagram Protocol (UDP) Through NATs (STUN) server. The endpoints then use the local STUN servers to verify communication paths. After the communication paths are verified, the endpoints may exchange multimedia communications.

ICE fails with certain security device configurations for the reasons described in the background section of copending patent application Ser. No. 11/265,596. Briefly, certain security device configurations intercept and drop incoming ICE messages thereby preventing communication path verification. Endpoints behind the security devices are thus unable to establish multimedia communications.

Because of the forgoing limitations, endpoints behind certain security devices are unable to establish multimedia communications. The disclosure that follows solves this and other problems.

SUMMARY OF THE INVENTION

A security policy enables security devices to forward ICE messages. The security policy may use protection tokens to prevent Denial of Service (DoS) attacks. This allows endpoints to use Interactive Connectivity Establishment (ICE) to enable multimedia communications across Network Address Translators (NATs) and other security devices.

The foregoing and other objects, features and advantages of the invention will become more readily apparent from the following detailed description of a preferred embodiment of the invention that proceeds with reference to the accompanying drawings.

DETAILED DESCRIPTION

Figure 1:
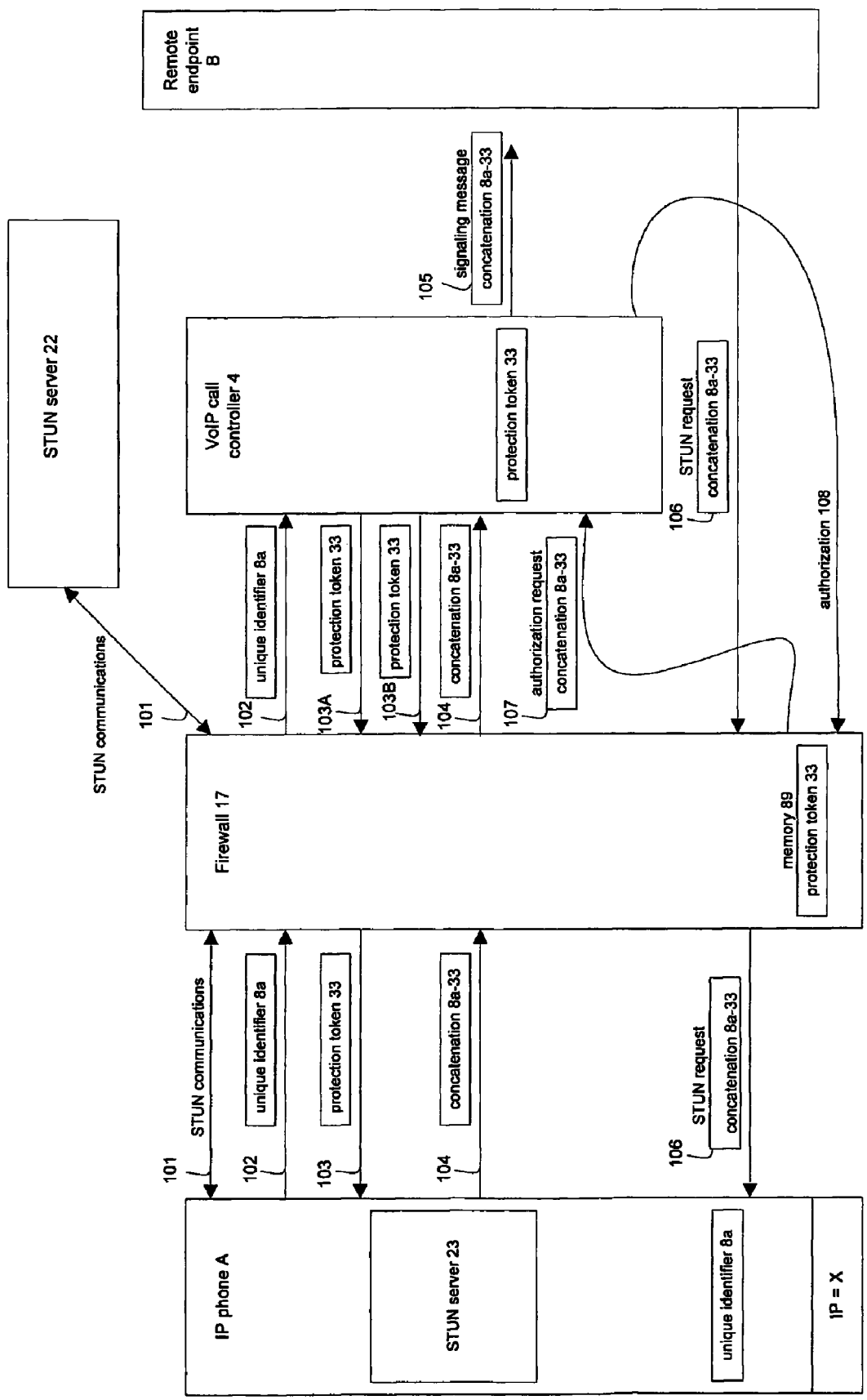
FIG. 1 is a diagram showing a first DoS protection scheme.

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

One method of allowing endpoints behind restrictive firewalls to establish multimedia communications is described in copending patent application Ser. No. 11/265,596. Briefly, a management device stores information about an initial outgoing message. Later, a security device receives an incoming ICE message and sends an authorization request to the management device. The management device compares information in the authorization request to information in memory. According to the comparison, the management device authorizes the security device to forward the ICE message. ICE is described in draft-ietf-mmusic-ice-06.txt which is herein incorporated by reference and which may be found on the Internet Engineering Task Force (IETF) website.

The above-described method may be vulnerable to certain types of Denial of Service (DoS) attacks. For example, a malicious person could repeatedly send unauthorized incoming ICE messages to the security device. The security device may repeatedly respond by sending authorization messages to the management device. The management device may repeatedly respond by making security comparisons and repeatedly denying authorization for the unauthorized incoming ICE messages. The repetition of each of these processes might overwhelm the hardware resources of the security device and/or the management device thereby disrupting normal network operations and preventing authorization of genuine incoming ICE messages.

FIG. 1 shows one example of a DoS security scheme that provides a preauthorization check that protects against certain types of DoS attacks. The call controller 4 operates with Voice over Internet Protocol (VoIP) calls but may be any type of control system. In this example, the functions of a firewall controller and a policy server have been optionally integrated into VoIP call controller 4. Other embodiments include non-integrated call controllers, firewall controllers and policy servers. The firewall 17 may be a restrictive Network Address Translator (NAT) or any other security device that restricts inbound communications including those from Internet Protocol (IP) addresses to which firewall 17 previously forwarded outbound communications. In this example the calling endpoint is an IP phone but may be any other endpoint such as a laptop computer, wireless IP communication device, cable modem, etc.

Outgoing Signaling Message

The DoS security scheme starts with IP phone A determining its own public IP address X by making Simple Traversal of User Datagram Protocol (UDP) Through NATs (STUN) communications 101 with a public STUN server 22. This is for determining whether IP phone A is located behind a NAT. For example, if a return address included in STUN communications 101 does not match IP address X then a NAT exists between IP phone A and the public STUN server 22. The IP phone A uses that IP address X to make a local STUN server 23 available so that a remote endpoint B may validate the communication path with IP phone A. The IP phone A also associates a generated unique identifier 8a with the local STUN server 23. The IP phone A then sends a call request 102 that includes the unique identifier 8a to a called endpoint B.

Next, VoIP call controller 4 receives the message 102 from IP phone A. Message 102 may be a call request message or may be a special message requesting authorization to establish a flow. Advantageously, if message 102 does not already contain protection token 33 or is a special message requesting authorization to establish a flow, the VoIP call controller 4 will respond to message 102 with rejection message 103A. Message 103A includes a network-selected protection token 33 which is subsequently used by IP phone A in the call setup message 104. If, however, message 102 already contains the protection token 33, the VoIP call controller 4 will process the message normally, as occurs in message 104, which already contains token 33.

The VoIP call controller 4 also may optionally send a communication 103B including protection token 33 to firewall 17. However, communication 103B is not necessary when a cryptographic computation system is used for authenticating protection token 33. When the cryptographic computation system is used, firewall 17 may alternatively include an algorithm for computing a range of acceptable values for protection token 33. When firewall 17 is not configured for cryptographic computation, firewall 17 stores the protection token 33 in a memory 89.

Although it is possible for VoIP call controller 4 to add the protection token 33 to message 102, rejection message 103A advantageously allows IP phone A to include the protection token 33 thereby ensuring that cryptographic signatures generated by IP phone A remain intact. For example, if IP phone A used a cryptographic signature to ensure that a call request was not modified, inclusion of the protection token 33 inside the encapsulation layer by the VoIP call controller 4 would break the signature.

In some embodiments, VoIP call controller 4 advantageously adapts Session Initiation Protocol (SIP) session policy protocols to process message 102. SIP session policy protocols have been established to provide the ability to reject SIP calls that do not conform to the user's authorized media parameters, for example bandwidth, simultaneous streams, or packetization intervals. Here, in contrast with conventional uses of session policy, message 102 is rejected for reasons other than media parameters. Specifically, message 102 may be rejected for not including protection token 33. Examples of SIP session policy protocols may be found in draft-hilt-sip-ping-session-policy-framework-00.txt and draft-hilt-sip-ping-session-spec-policy-03.txt which are herein incorporated by reference and which may be found on the Internet Engineering Task Force (IETF) website.

The IP phone A receives rejection message 103A including the network-selected protection token 33. The protection token 33 is usable by firewall 17 during an initial authorization check to protect against DoS attacks. IP Phone A includes the network-selected protection token 33 in the call request 104. During inclusion IP phone A may prepend or append the protection token 33 to the unique identifier 8a as represented in FIG. 1 by the "-" marks. In some embodiments, IP phone A may include an "@" symbol as a spacer between the unique identifier 8a and the protection token 33. Here, the spacer may signal to a security device where unique identifier 8a ends and where protection token 33 begins. Other symbols may used as spacers so that the protection token 33 may later be identified and parsed from call request 104.

The IP phone A sends a new call request 104 including the concatenated unique identifier 8a and protection token 33. After receiving call request 104, VoIP call controller 4 sends a call signaling message 105 to the called endpoint that includes the same unique identifier 8a and protection token 33 as appeared in message 104.

In summary, up to this point several processes have been performed to include the protection token 33 in an outgoing signaling message 105. An initial message 102 elicited a response 103A containing the protection token 33. IP phone A then concatenated the unique identifier 8a with the token 33. Finally an outgoing call signaling message 105 including the concatenation was sent by call controller 4 to the called endpoint B.

ICE Protocol Operations by the Called Endpoint B

Next several ICE processes are performed by the called endpoint B. Although these processes are briefly described below, they are not all shown in FIG. 1.

A call controller for the called endpoint B receives the signaling message 105 and communicates the concatenation including the unique identifier 8a and the protection token 33 to the called endpoint B. The token 33 is automatically included in the communication because they are concatenated with the unique identifier 8a.

Next, the called endpoint B optionally determines its own public IP address by exchanging STUN communications with any public STUN server. The remote endpoint B then creates a local STUN server on itself, generates its own unique identifier, and sends back a SIP signaling message (not shown) including IP addresses and UDP ports and its own unique identifier for its local STUN server. The called endpoint B also sends IP phone A a STUN request 106 including the unique identifier 8a. The protection token 33, being concatenated with the unique identifier 8a, is automatically included in the STUN request 106.

Incoming STUN Request

The incoming STUN request 106 is intercepted by firewall 17. Conventionally the STUN request 106 would be dropped by firewall 17. Instead, copending patent application Ser. No. 11/265,596 teaches that firewall 17 may forward the STUN request 106 to call controller 4 for authorization. Here, before STUN request 106 is forwarded to a call controller 4, firewall 17 may additionally perform a comparison to protect against a DoS attack.

The firewall 17 compares a value of the protection token 33 included in STUN request 106 to a value stored in memory 89 or to a value cryptographically calculated by the firewall 17. The comparison takes substantially less clock cycles than a subsequent authorization by call controller 4. In one example, the comparison by firewall 17 takes only 50 clock cycles as described in copending patent application Ser. No. 10/215,544 which is herein incorporated by reference.

When there is no match, firewall 17 drops the STUN request 106 and does not send an authorization request to VoIP call controller 4. Thus, in the case where a fraudulent STUN request is sent (unauthorized protection token or no protection token), the system uses a computationally lightweight technique in firewall 17 to avoid consuming resources on a relatively intensive authorization check by management device 4 thereby protecting against a DoS attack.

When there is a match, firewall 17 may send an authorization request 107 to VoIP call controller 4 for a second level authorization as described in copending patent application Ser. No. 11/265,596. The VoIP call controller 4 may perform this second and subsequent and preferably more secure authorization by, for example, comparing the protection token 33 to a value stored in memory. The subsequent authorization may compare portions of the protection token that were not examined by firewall 17. In some examples, the subsequent authorization may also compare any combination of the unique identifier 8a and the protection token 33. Generally the subsequent authorization may involve substantially more bits of randomness than the initial authorization check and may take substantially more clock cycles.

As described in copending application Ser. No. 11/265,596, when the compared values match the call controller 4 may send back an authorization 108. STUN request 106 contains a STUN Transaction ID, which firewall 17 may then store before forwarding the STUN request 106 to IP phone A. Thereafter, additional steps may be performed to complete ICE as described in copending application Ser. No. 11/265,596.

Figure 2:
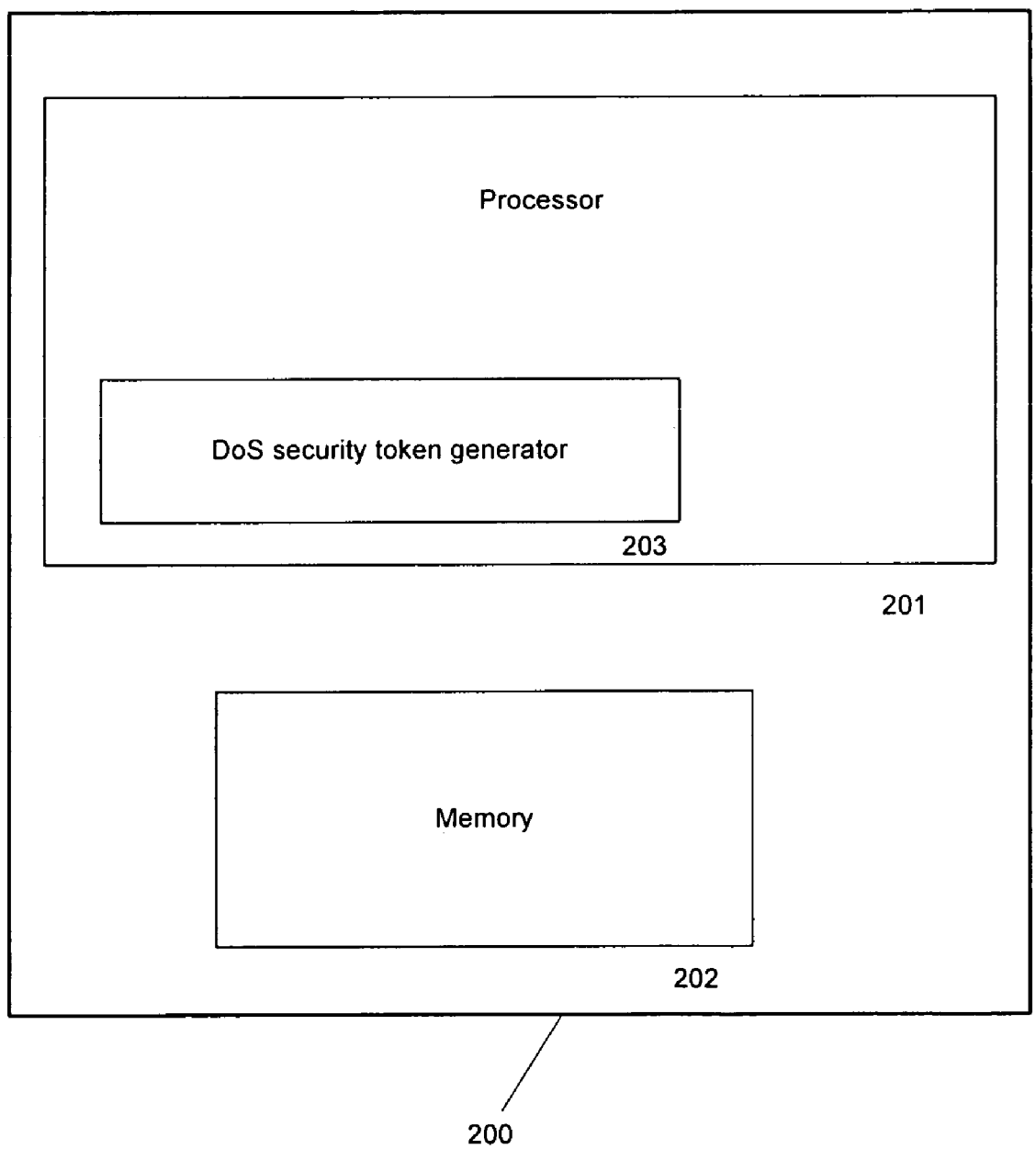
FIG. 2 is a diagram of the call controller shown in FIG. 1.

FIG. 2 shows a call controller 200 that authorizes ICE messages. The call controller 200 includes a processor 201, memory 202 and a DoS security token generator 203. The token generator 203 may generate network-selected protection tokens in such a way that a firewall is able to authenticate the token generated by DoS security token generation 203. The memory 202 includes instructions that, when executed by the processor 201, perform the functions described in the flowcharts of FIG. 3.

Figure 3:
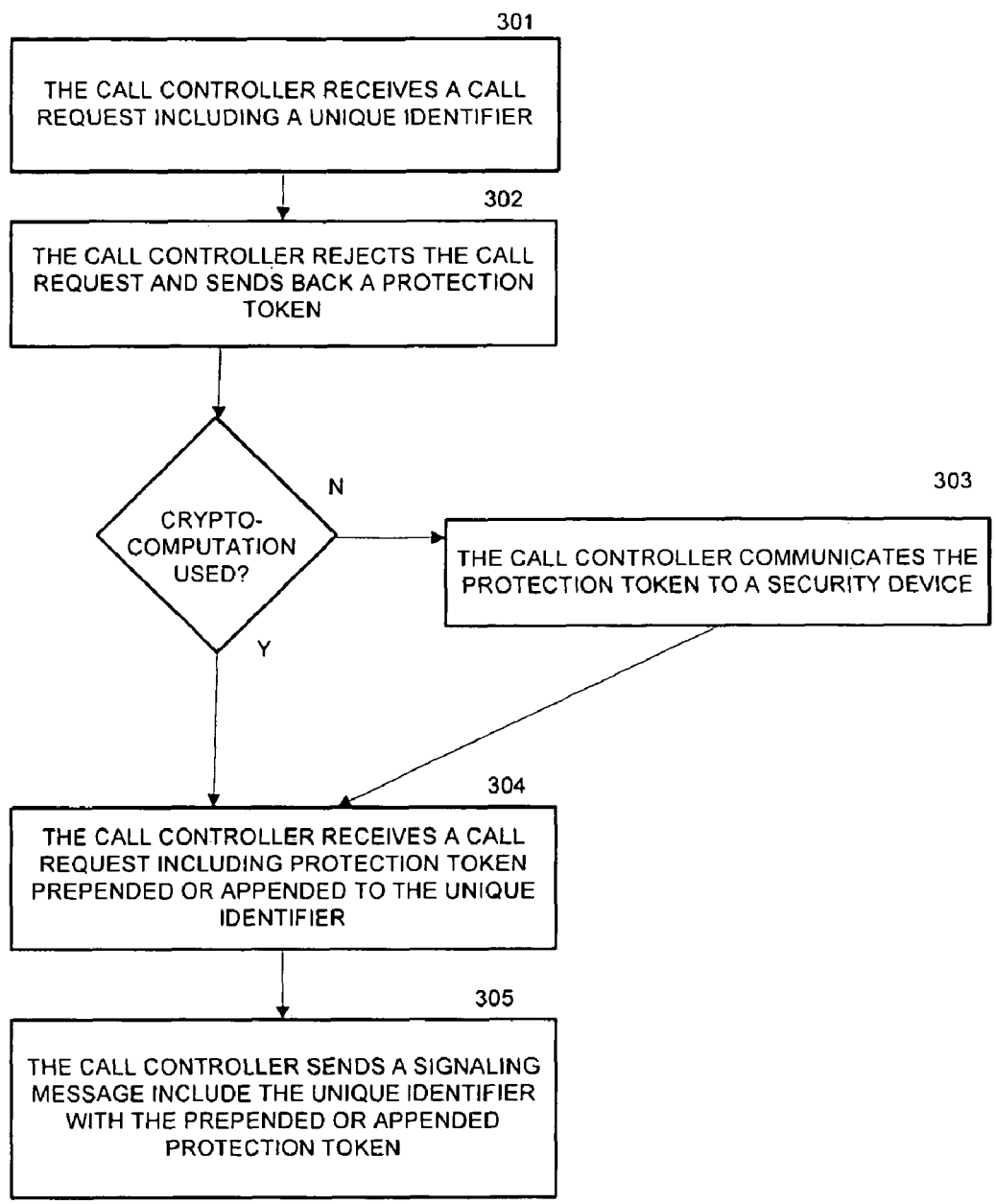
FIG. 3 is a flowchart showing how the call controller in FIG. 2 provides protection tokens.

Referring to FIG. 3, call controller 200 in block 301 receives a message including a unique identifier. Call controller 200 responds to the message, sending back a protection token generated in block 302. In block 303 the call controller 200 communicates the protection token to a security device, such as firewall 17 in FIG. 1. When call controller 200 is part of a system using cryptographic computation, the communication in block 303 may be skipped.

Next, the call controller 200 receives a call request including a unique identifier in block 304. The protection token may be prepended or appended to the unique identifier. Finally, the call controller 200 sends a signaling message with the unique identifier and the prepended or appended tokens in block 305.

Figure 4:
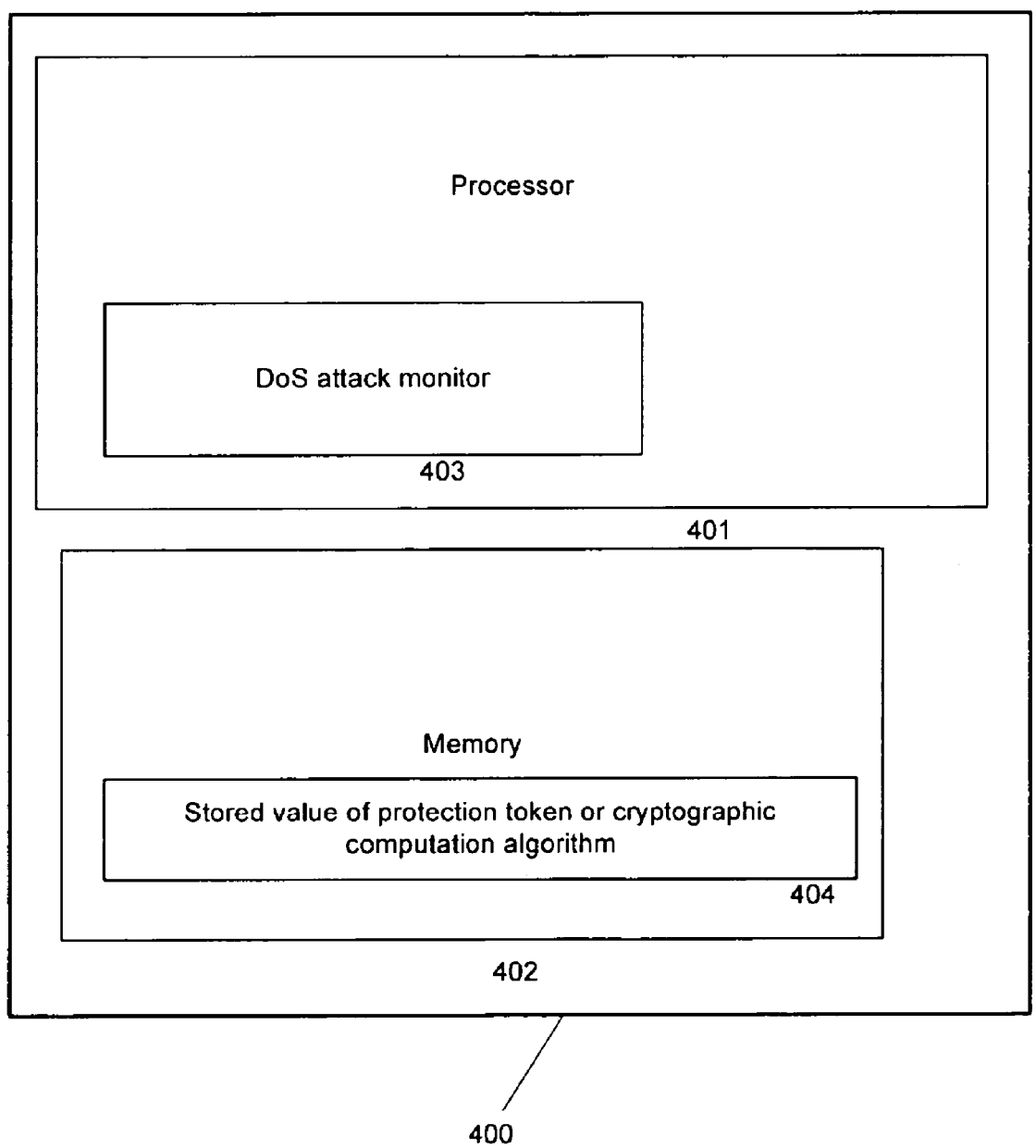
FIG. 4 is a diagram of a firewall shown in FIG. 1.

FIG. 4 shows a firewall 400 that protects against DoS attacks. The firewall 400 includes a processor 401, a memory 402 and a DoS attack monitor 403. The DoS attack monitor 403 may compare a value of a protection token to a stored value 404. Alternatively, DoS attack monitor 403 may use a cryptographic computation according to a stored algorithm 404 to authenticate a value of a protection token. The memory 402 includes instructions that, when executed by the processor 401, perform the functions described in the flowcharts of FIG. 5.

Figure 5:
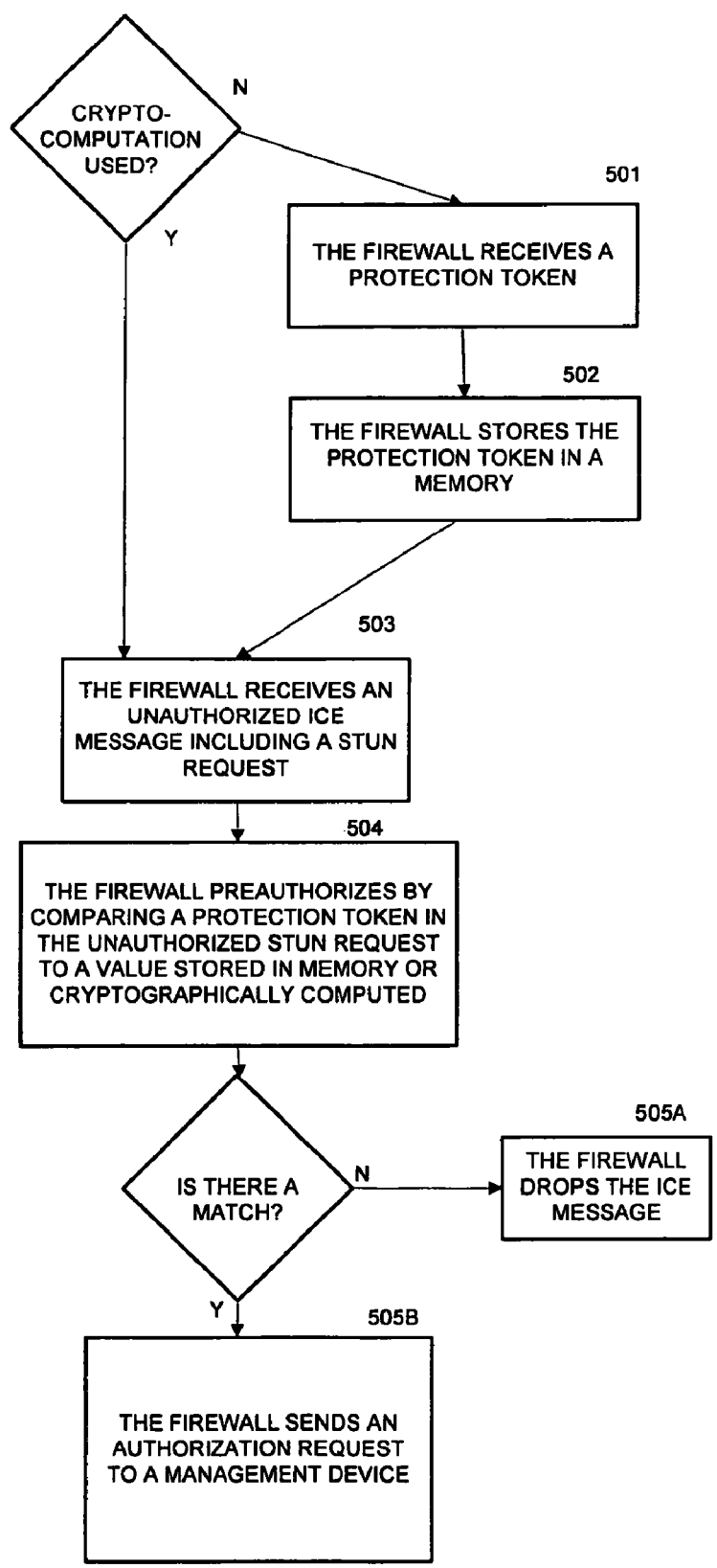
FIG. 5 is a flowchart showing how the firewall in FIG. 4 protects against DoS attacks.

Referring to FIG. 5, the firewall 400 receives a protection token in block 501. In block 502 the firewall 400 stores the protection token. The processes in blocks 501 and 502 are not performed when cryptographic computation is used.

In block 503 the firewall 500 receives an unauthorized ICE message including a STUN request. In block 504 the firewall performs a preauthorization check by comparing a value of a protection token from the received unauthorized ICE message with a value stored in memory or cryptographically computed. When there is no match, the firewall 500 drops the unauthorized ICE message in block 505A. When there is a match in block 505B, the firewall 500 may send an authorization request to a management device for a subsequent authorization.

Figure 6:
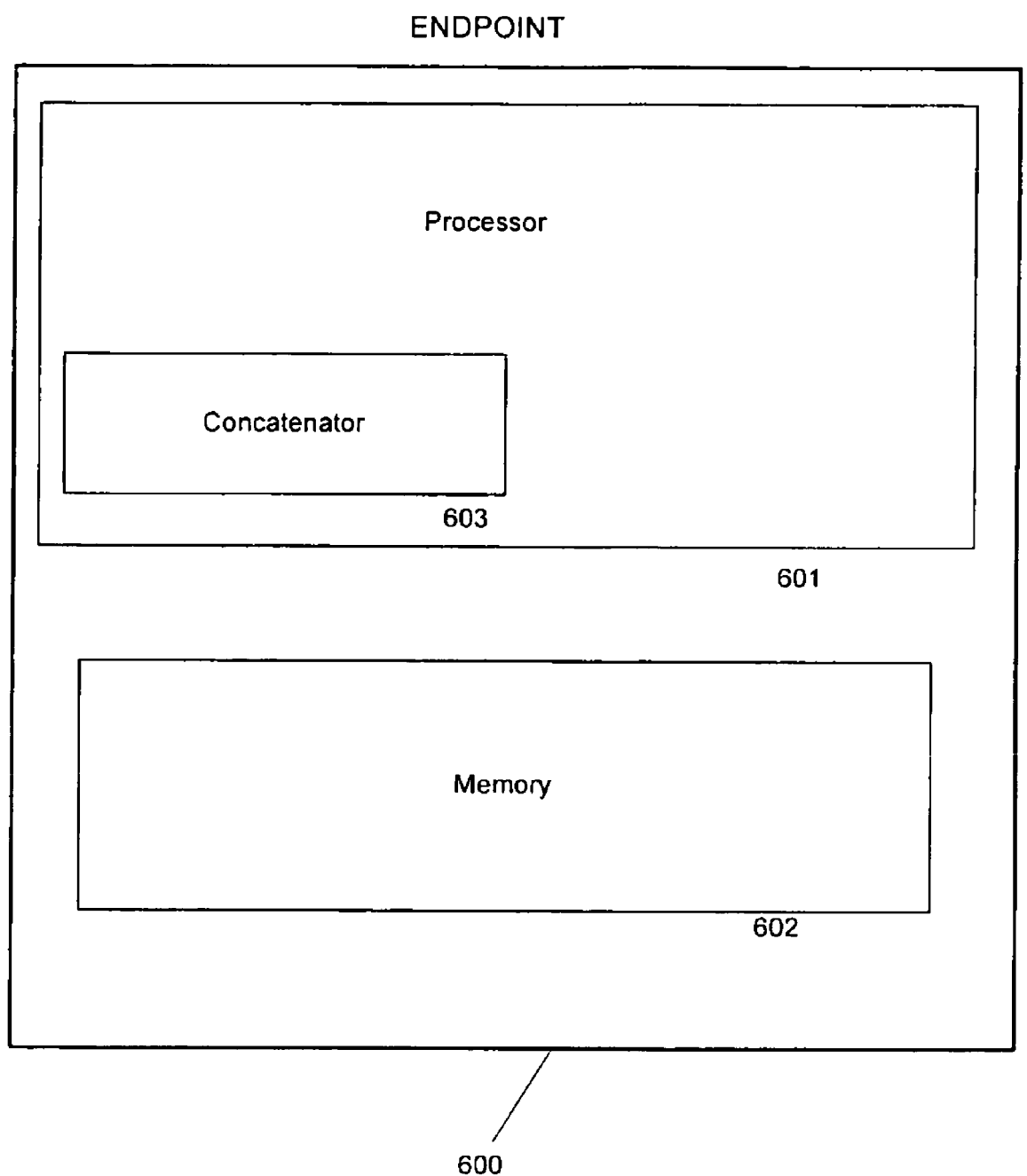
FIG. 6 is a diagram of an endpoint shown in FIG. 1.

FIG. 6 shows an endpoint 600 that appends or prepends an authorization token to a unique identifier. The endpoint 600 includes a processor 601, a memory 602 and a concatenator 603. The concatenator 603 may concatenate a unique identifier and a network-selected protection token. The memory 602 includes instructions that, when executed by the processor 601, perform the functions described in the flowcharts of FIG. 7.

Figure 7:
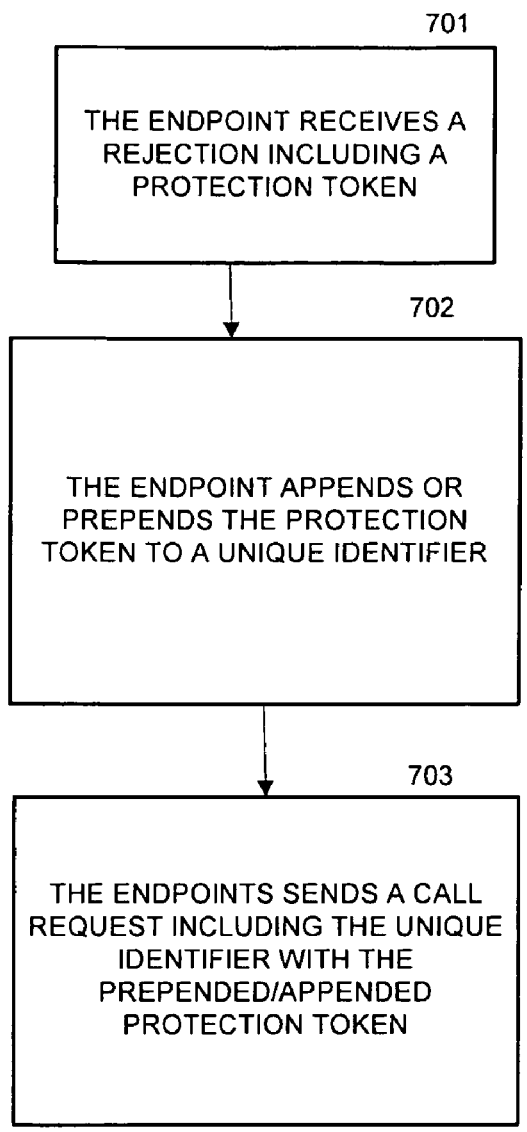
FIG. 7 is a flowchart showing how the endpoint in FIG. 6 prepends/appends protection tokens.

Referring to FIG. 7, the endpoint 600 receives a rejection including a network-selected protection token in block 701. In block 702 the endpoint 600 appends or prepends the protection token to a unique identifier. The endpoint 600 sends a call request including the unique identifier with the prepended or appended protection token in block 703.

Figure 8:
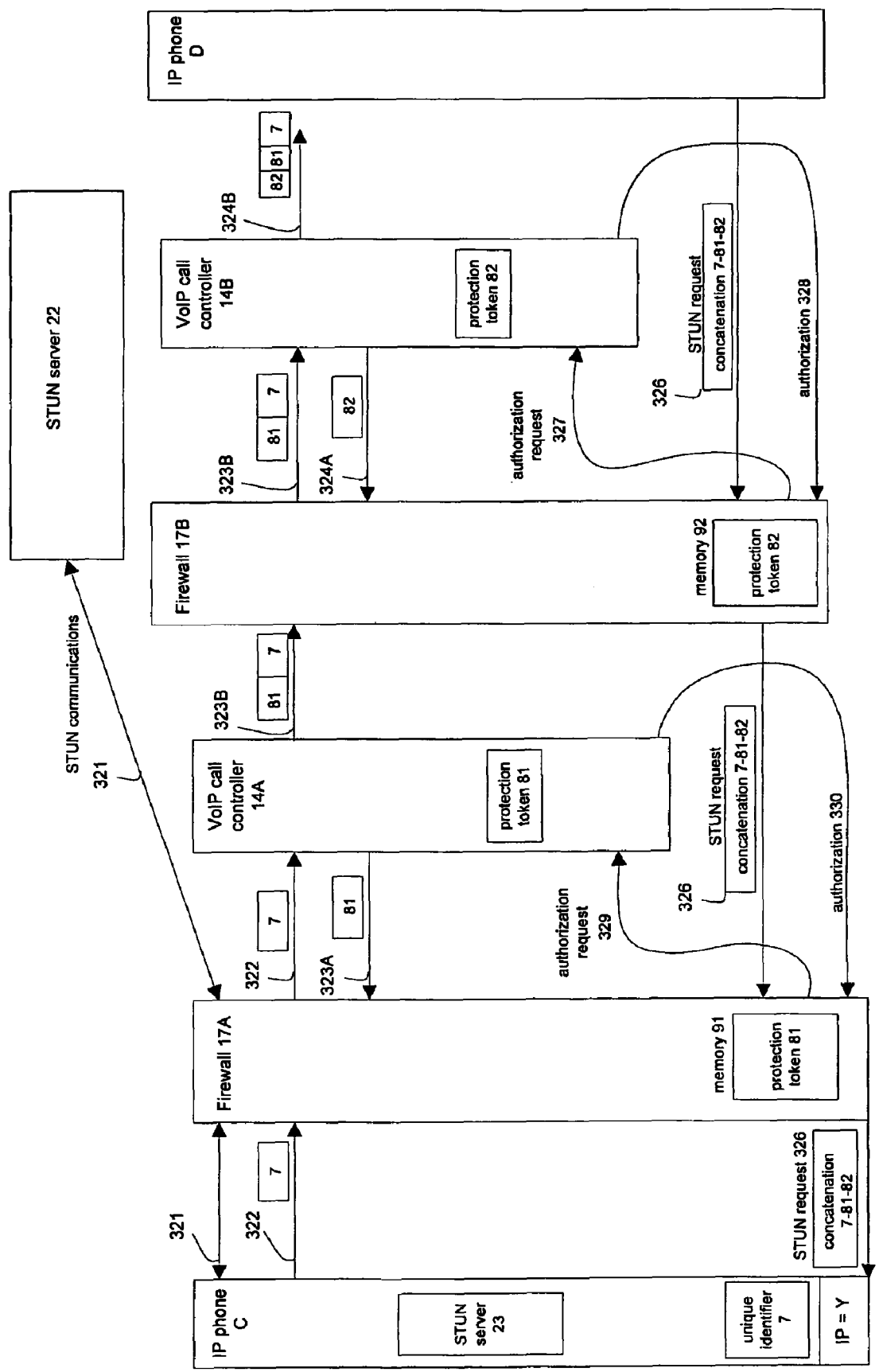
FIG. 8 is a diagram showing a second DoS protection scheme.

FIG. 8 shows a second DoS security scheme that provides a preauthorization check that protects against certain types of DoS attacks. In this example, ICE is used to traverse nested firewalls 17A and 17B. A nested firewall configuration may arise, for example, when a local network using a local firewall is also protected from the Internet by an Internet Service Provider (ISP) firewall. The call controllers 14A and 14B operate with VoIP calls but may be any type of control system. In this example the functions of firewall controllers and a policy servers have been optionally incorporated into VoIP call controllers 14A and 14B. Other embodiments include nonintegrated call controllers, firewall controllers and policy servers.

Outgoing Signaling Message

The DoS security scheme starts with IP phone C determining its own IP address Y by making Simple Traversal of User Datagram Protocol (UDP) Through NATs (STUN) communications 321 with a public STUN server 22. This is for determining whether IP phone C is located behind a NAT. The IP phone C uses that IP address Y to make a local STUN server 24 available so that an endpoint may establish a communication path with IP phone C. The IP phone C also associates a generated unique identifier 7 with that local STUN server 24. The IP phone C then sends a call request 322 to provide the unique identifier 7 to IP phone D.

Next, VoIP call controller 14A receives a call request 322 including unique identifier 7 from IP phone C. Advantageously, the VoIP call controller 14A may add a protection token 81 to an addressing header that is located outside an encapsulation layer. In some embodiments, VoIP call controller 14A inserts the protection token 81 into a SIP "via" header. The "via" header is described in more detail in Request For Comment (RFC) 3261 which is herein incorporated by reference and may be found on the IEFT website.

Inclusion of the protection token 81 into a header outside an encapsulation layer is advantageous because said inclusion ensures that cryptographic signatures remain intact. For example, if IP phone C used a cryptographic signature to ensure that call request 322 was not modified, inclusion of the protection token 81 in a header outside of the encapsulation layer may avoid breaking cryptographic signatures.

The above protection token provisioning scheme facilitates inclusion of a plurality of tokens by a plurality of call controllers. In a nested security device configuration with different networks each call controller may add its own protection token so that each network may be protected from DoS attacks independently of the other networks. For example, here it may be advantageous for call controller 14A to add a protection token 81 because it may not have information on whether call controller 14B is configured to provide a DoS attack protection token 82.

A notification 323A of protection token 81 may be sent to inner firewall 17A. Notification 323A is not sent when cryptographic computation is used. VoIP call controller 14A also sends a communication 323B including the protection token 81 and the unique identifier 7.

Next, VoIP call controller 14B may add a protection token 82 to an addressing header that is located outside an encapsulation layer. Notification 324A including protection token 82 may be sent to outer firewall 17B when cryptographic computation is not used. VoIP call controller 14B also sends a call signaling message 324B including the protection tokens 81 and 82 and the unique identifier 7.

In summary, up to this point processes have been performed to include the protection tokens 81 and 82 as headers in an outgoing signaling message 324B.

ICE Protocol Operations by the Called Endpoint

Next several ICE processors are performed by the called endpoint. Some of these processes are both described below and shown in FIG. 8 while others are briefly described below and not shown in FIG. 8.

A call controller (not shown) for IP phone D receives the signaling message 324B and sends IP phone D a communication including the unique identifier 7 and the headers with the protection tokens 81 and 82.

Next IP phone D determines its own IP address by exchanging STUN communications (not shown) with any public STUN server. IP phone D then creates a local STUN server on itself and sends back a signaling message (not shown) including specifics about that local STUN server.

The IP phone D also prepares to send back a STUN request 326 including the unique identifier 7. IP phone D may prepend or append each of the protection tokens 81 and 82 to the unique identifier 7. IP phone D may also include the protections tokens 81 and 82 in STUN request 326 by any other means, for example by including them in one or more headers. The IP phone D may include a bit pattern between these tokens to ease parsing by firewalls, similar to what IP phone A did with reference to FIG. 1. In one embodiment, the symbol "@" is used between tokens. IP phone D then sends IP phone C a STUN request 326 including the unique identifier 7 with the prepended or appended tokens 9, 81 and 82.

Incoming STUN Request

The incoming STUN request 326 is intercepted by firewall 17B. Firewall 17B compares a value of the protection token 82 included in STUN request 326 to either a cryptographic computation or a value stored in memory 92. When there is no match, firewall 17B drops the STUN request 326. The firewall 17B does not send an authorization request to VoIP call controller 14B thereby protecting against a DoS attack.

When there is a match, firewall 17B sends an authorization request 327 to VoIP call controller 14B. VoIP call controller 14B may perform a subsequent and preferably more secure authorization check before sending back authorization 328.

The firewall 17B may then forward the STUN request 326, which is intercepted by firewall 17A. Firewall 17A compares a value of the protection token 81 included in STUN request 326 to either a cryptographic computation or a value stored in memory 91. When there is no match, firewall 17A drops the STUN request 326. The firewall 17A does not send an authorization request to VoIP call controller 14A thereby protecting against a DoS attack.

When there is a match, firewall 17A sends an authorization request 329 to VoIP call controller 14A. VoIP call controller 14A may perform a subsequent and preferably more secure authorization check before sending back authorization 330.

The firewall 17A may then forward the STUN request 326 to IP phone C. Thereafter, additional steps may be performed to complete ICE as described in copending application Ser. No. 11/265,596. However, here the IP phone C may receive STUN request 326 containing protection tokens 81 and 82 which were not selected or known to IP phone C, as they were included by other devices in the DoS protection scheme. Thus, for the purposes of ICE connectivity checks, IP Phone C may be configured to ignore protection tokens 81 and 82 and only validate the incoming STUN Request 326 by examining unique identifier 7.

Figure 9:
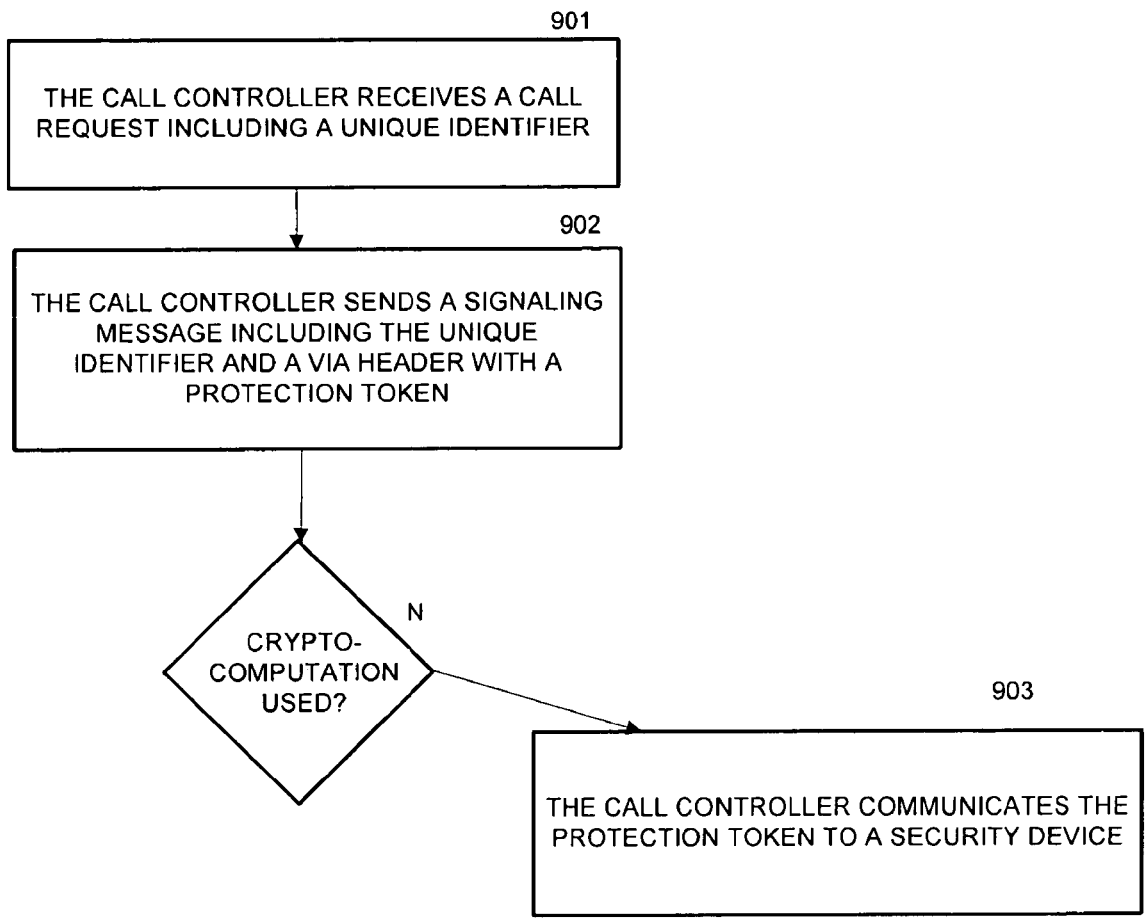
FIG. 9 is a flowchart showing how the controller in FIG. 2 provides protection tokens according to the second DoS protection scheme.

FIG. 9 shows a flowchart of the functions performed by call controller 200 when operating according to the second example of the DoS security scheme. Call controller 200 in block 901 receives a call request including a unique identifier. Call controller 200 then sends a signaling message including both the unique identifier and a via header with a protection token in block 902. In block 903 the call controller 200 communicates the protection token to a security device. The process in block 903 is not performed when the protection token is cryptographically computed.

Figure 10:
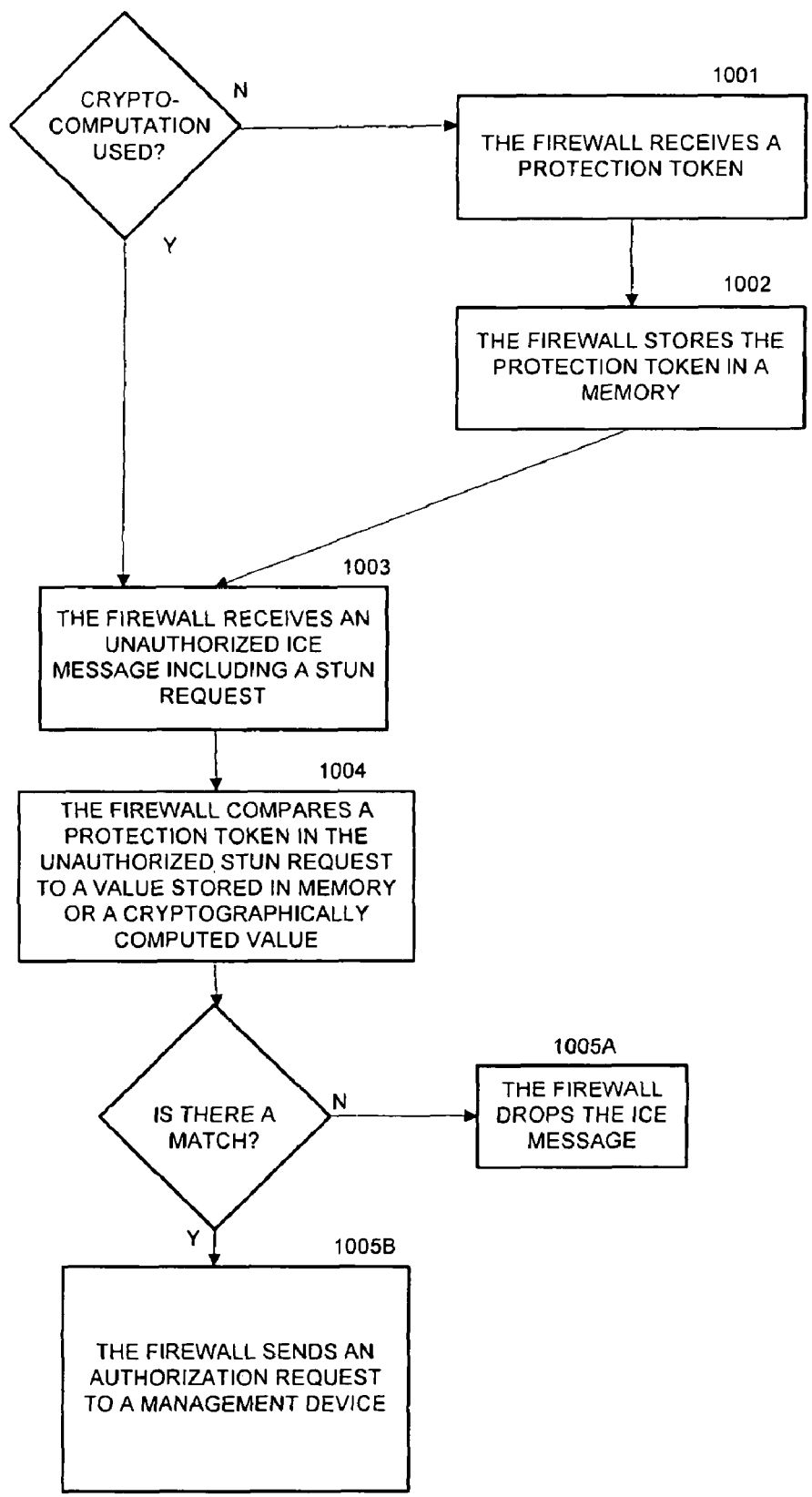
FIG. 10 is a flowchart showing how the firewall in FIG. 4 protects against DoS attacks according to the second DoS protection scheme.

FIG. 10 shows a flowchart of the functions performed by firewall 400 when operating according to the second example of the DoS security scheme. The firewall 400 receives a protection token in block 1001. In block 1002 the firewall 400 stores the protection token in a memory. The processes in blocks 1001 and 1002 may be omitted when the protection token is cryptographically computed.

In block 1003 the firewall 400 receives an unauthorized ICE message including a STUN request. In block 1004 the firewall 400 compares a value of a protection token from the received unauthorized ICE message with a either value stored in memory or a cryptographically computed value. When there is no match, the firewall 400 drops the unauthorized ICE message in block 1005A. When there is a match, the firewall 400 sends an authorization request to a management device in block 1005B.

Figure 11:
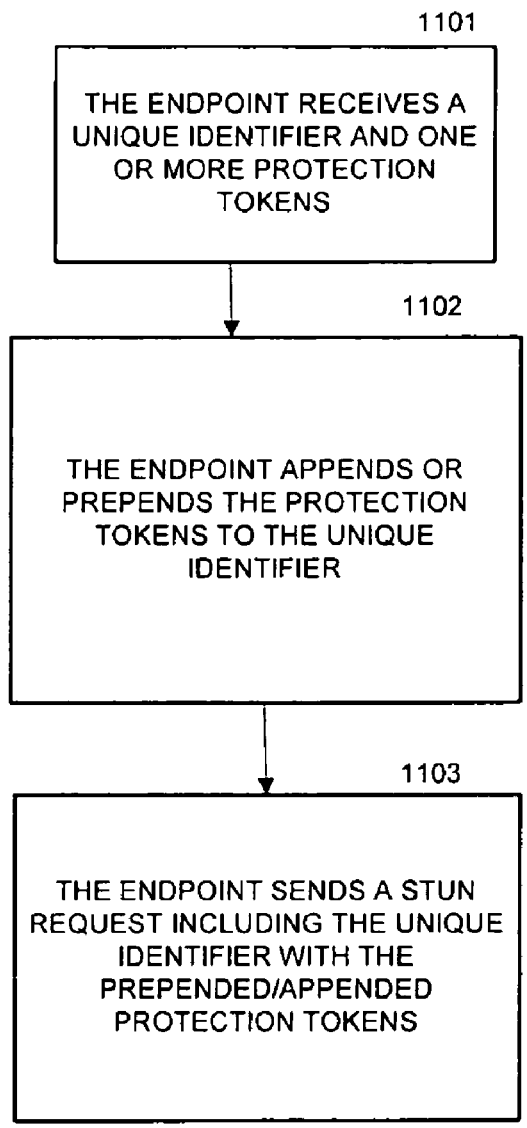
FIG. 11 is a flowchart showing how the endpoint in FIG. 6 concatenates protection tokens with a unique identifier according to the second DoS protection scheme.

FIG. 11 shows a flowchart of the functions performed by endpoint 600 when operating according to the second example of the DoS security scheme.

The endpoint 600 receives a communication including a unique identifier and one or more "via" headers in block 1101. Each "via" header may include one protection token. In block 1102 the endpoint 600 appends or prepends the one or more protection tokens to the unique identifier. The endpoint 600 sends a STUN request including the unique identifier with the prepended or appended tokens in block 1103.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

What is claimed is:

1. An apparatus, comprising:
a processing device configured to generate and store a protection token;
the processing device configured to reject a received initial outgoing message and in response send back the protection token;
the processing device configured to receive a subsequent outgoing message including the protection token in response to the rejection, to include the protection token in a locally generated path verification message that is used for establishing a media flow across a security device; and
the processing device configured to receive, from the security device, an authorization request including an entire Simple Traversal of User Datagram Protocol (UDP) through Network Address Translators (STUN) request that includes the protection token, to compare the stored protection token with the STUN request, to remove the protection token and send the entire tokenless STUN request back to the security device to authorize forwarding by the security device.

2. The apparatus according to claim 1, wherein the locally generated path verification message is an Interactive Connectivity Establishment (ICE) message and includes a unique identifier that is used for STUN message authorization.

3. The apparatus according to claim 2, wherein the ICE message is configured to cause a called endpoint to send the STUN request, and wherein the STUN request sent from the called endpoint includes both the protection token and the unique identifier and is addressed to a source of both the initial and subsequent outgoing messages.

4. The apparatus according to claim 1, wherein the protection token is configured for use by the security device in a Denial of Service (DoS) preauthorization check.

5. The apparatus according to claim 1, wherein both the protection token and the unique identifier are included within an encapsulated portion of the STUN request, the encapsulation portion having a cryptographic signature.

6. The apparatus according to claim 1, further comprising the processing device configured to communicate the protection token to a firewall.

7. A security device, comprising:
a processing device configured to compare a value of a protection token included in a received unverified media flow establishment message to a value stored in memory, the processing device configured to request authorization for the still unverified media flow establishment message when the values match;
wherein the authorization request is based on a unique identifier included in the unverified media flow establishment message, the unique identifier being a Simple Traversal of User Datagram Protocol (UDP) through Network Address Translators (STUN) message authorization token; and
the processing device configured to open a pinhole when a validation message is received back in response to the authorization request;
wherein the pinhole is a path through the security device through which messages associated with a particular source address may pass.

8. The security device of claim 7, further comprising the processing device configured to communicate at least a portion of the unverified media flow establishment message to an inner nested security device when the authorization request is validated.

9. The security device of claim 7, further comprising the processing device configured to store a STUN transaction identifier included in the unverified media flow establishment message after receiving the validation message.

10. The security device of claim 7, wherein an unverified STUN request is communicated to a management device as at least a portion of the authorization request.

11. A method, comprising:
sending, using a processing device, a locally generated media flow establishment message including both a header including a locally generated protection token and a non-header including a non-locally generated unique identifier from a received outgoing call request; and
receiving, at the processing device, an authorization request for a Simple Traversal of User Datagram Protocol (UDP) through Network Address Translators (STUN) request message in response to sending the media flow establishment message, the authorization request including the unique identifier concatenated with the protection token.

12. The method of claim 11, wherein the media flow establishment message includes a plurality of headers, each header including a different protection token generated by a different network.

13. A method, comprising:
concatenating, using a processing device, a received unique identifier with one or more received protection tokens, the one or more received protection tokens each removed from separate headers and configured for use in both a preliminary and final verification of a media flow establishment message; and
sending, using the processing device, the concatenated unique identifier and the one or more received protection tokens in a media flow addressed to an endpoint;
wherein the media flow comprises a Simple Traversal of User Datagram Protocol (UDP) through Network Address Translators (STUN) request.

14. The method of claim 13, wherein the one or more received protection tokens are each removed from separate Session Initiation Protocol (SIP) Via headers.

15. The method of claim 13, wherein the STUN request is associated with a STUN server that is located at a generation source of the unique identifier.

16. An apparatus, comprising:
processing device configured to concatenate a received unique identifier with one or more received protections tokens, the one or more received protection tokens each removed from separate headers and configured for use in both a preliminary and final verification of a media flow establishment message; and the processing device configured to send the concatenated unique identifier and the one or more received protection tokens in a media flow addressed to an endpoint;

wherein the media flow comprises a Simple Traversal of User Datagram Protocol (UDP) through Network Address Translators (STUN) request.

17. The method of claim 16, wherein the one or more received protection tokens are each removed from separate Session Initiation Protocol (SIP) Via headers.

18. The apparatus of claim 16, wherein the STUN request is associated with a STUN server that is located at a generation source of the unique identifier.

19. An apparatus, comprising:

a processing device configured to send a locally generated media flow establishment message including both a header including a locally generated protection token and a non-header including a non-locally generated unique identifier from a received outgoing call request; and the processing device configured to receive an authorization request for a Simple Traversal of User Datagram Protocol (UDP) through Network Address Translators (STUN) request message in response to sending the media flow establishment message, the authorization request including the unique identifier concatenated with the protection token.

20. The apparatus of claim 19, wherein the received STUN request is unverified.

21. The apparatus of claim 19, wherein the media flow establishment message includes a plurality of headers, each header including a different protection token generated by a different network.

\* \* \* \* \*